United States Patent
Klemm

(10) Patent No.: US 12,077,216 B2
(45) Date of Patent: Sep. 3, 2024

(54) MOTOR VEHICLE

(71) Applicant: Bayerische Motoren Werke Aktiengesellschaft, Munich (DE)

(72) Inventor: Matthias Klemm, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 314 days.

(21) Appl. No.: 17/630,396

(22) PCT Filed: Jul. 2, 2020

(86) PCT No.: PCT/EP2020/068673
§ 371 (c)(1),
(2) Date: Jan. 26, 2022

(87) PCT Pub. No.: WO2021/108509
PCT Pub. Date: Feb. 4, 2021

(65) Prior Publication Data
US 2022/0289295 A1 Sep. 15, 2022

(30) Foreign Application Priority Data
Jul. 31, 2019 (DE) .................. 10 2019 120 607.3

(51) Int. Cl.
*B62D 25/20* (2006.01)
*B62D 21/03* (2006.01)
*B62D 21/15* (2006.01)

(52) U.S. Cl.
CPC ............. *B62D 25/20* (2013.01); *B62D 21/03* (2013.01); *B62D 21/157* (2013.01)

(58) Field of Classification Search
CPC ...... B62D 21/03; B62D 21/157; B62D 25/20; B62D 27/02; B62D 27/023; B62D 27/06; B62D 27/065

(Continued)

(56) References Cited

U.S. PATENT DOCUMENTS 6,015,183 A * 1/2000 Vlahovic ............... B62D 25/20
296/204
6,595,581 B2 * 7/2003 Wolkersdorfer ....... B62D 21/10
296/204
2016/0159405 A1 6/2016 Toriyama et al.

FOREIGN PATENT DOCUMENTS

CA 2 867 108 A1 10/2013
CN 207510521 U 6/2018
(Continued)

OTHER PUBLICATIONS

English-language Chinese Office Action issued in Chinese application No. 202080052477.8 dated Apr. 14, 2023 (Six (6) pages).

(Continued)

*Primary Examiner* — Dennis H Pedder
(74) *Attorney, Agent, or Firm* — Crowell & Moring LLP

(57) ABSTRACT

A motor vehicle includes a body which has a floor, where an open hollow profile is formed in the floor. The open hollow profile is bridged by the crossbeam. The crossbeam has at least one open hollow profile in a center region of the crossbeam, where a first outer profile section and a second outer profile section are integrally attached to the at least one open hollow profile in a transverse direction. The first outer profile section and the second outer profile section are spaced apart from one another by the at least one open hollow profile. The first outer profile section has a first rounded outer profile section and the second outer profile section has a second rounded outer profile section.

6 Claims, 4 Drawing Sheets

(58) Field of Classification Search
USPC .................. 296/204, 193.07, 187.12, 29, 30
See application file for complete search history.

(56) References Cited

FOREIGN PATENT DOCUMENTS

| | | |
|---|---|---|
| DE | 195 43 404 A1 | 5/1997 |
| DE | 10 2005 022 006 A1 | 11/2006 |
| DE | 10 2007 001 721 A1 | 7/2008 |
| DE | 10 2016 100 392 A1 | 7/2016 |
| EP | 1 876 086 A1 | 1/2008 |
| EP | 3 263 427 A2 | 1/2018 |
| JP | 63-11217 U | 1/1988 |
| JP | 8-80874 A | 3/1996 |
| JP | 2008-184125 A | 8/2008 |

OTHER PUBLICATIONS

PCT/EP2020/068673, International Search Report dated Sep. 17, 2020 (Two (2) pages).
German Search Report issued in German application No. 10 2019 120 607.3 dated Jun. 22, 2020, with Statement of Relevancy (Seven (7) pages).

* cited by examiner

MOTOR VEHICLE

BACKGROUND AND SUMMARY OF THE INVENTION

The invention relates to a motor vehicle.

A motor vehicle in which an open hollow profile region, for example a center tunnel, is formed on the floor of a body is known from DE 10 2005 022 006 A1. A reinforcement strut bridges the open hollow profile region on the floor of the body. The reinforcement strut may be produced integrally as a sheet-metal shell. In another embodiment, the reinforcement strut is configured as an extruded section.

The problem addressed by the invention is that of creating a motor vehicle with a body which has an open hollow-profile region, the region being easily bridged by a reinforcement assembly.

A motor vehicle according to the invention comprises a body with a floor. At least one open hollow profile is formed on the body, the hollow profile being bridged by at least one crossbeam.

At least one open hollow profile is advantageously provided in a center region in the case of the at least one crossbeam. An outer profile in each case is integrally attached to the at least one open, center profile in a transverse direction. The outer profiles, spaced apart from one another by the center, open profile in each case, each have a rounded, outer profile section.

In an advantageous embodiment, the crossbeam in each case covers the open hollow profile region of a (center) tunnel formed on the floor of the body. The crossbeam which is present in each case is used in this embodiment in the event of an accident on one side of the body, in order to ensure the power flow in the transverse vehicle direction from the force transmission side on the side facing the impact, via the crossbeam, to the side of the body facing away from the impact.

Apart from the rigidity required in the load direction, i.e., in the longitudinal direction of the crossbeam, the crossbeam according to the invention is advantageously also lightweight. The rounded outer profile sections produce an aerodynamic form.

The at least one center, open hollow profile in the crossbeam present in each case advantageously has a U-shaped or V-shaped design.

In advantageous embodiments, the two outer, rounded profile sections may each be the same height or different heights. In an advantageous embodiment, the outer, rounded profile section facing in the direction of travel exhibits a height that is lower than the height of the outer, rounded profile section facing away from the direction of travel. The lower height of the outer, rounded profile section facing in the direction of travel reduces the air resistance.

In an advantageous embodiment, the at least one center, open profile section has a height which corresponds to the height of an outer, rounded profile section. The height of the at least one central, open profile section (hollow profile) is greater than the height of the other opposite, outer, rounded profile section.

The two outer, rounded profile sections are advantageously designed as a profile with a roughly rectangular cross section.

The crossbeam is advantageously a roll-formed component.

In an advantageous embodiment, the crossbeam is produced from a sheet steel or, in another advantageous embodiment, from a light metal.

One embodiment of the invention is described below by way of example with the help of the drawings.

DETAILED DESCRIPTION OF THE DRAWINGS

Figure 1:
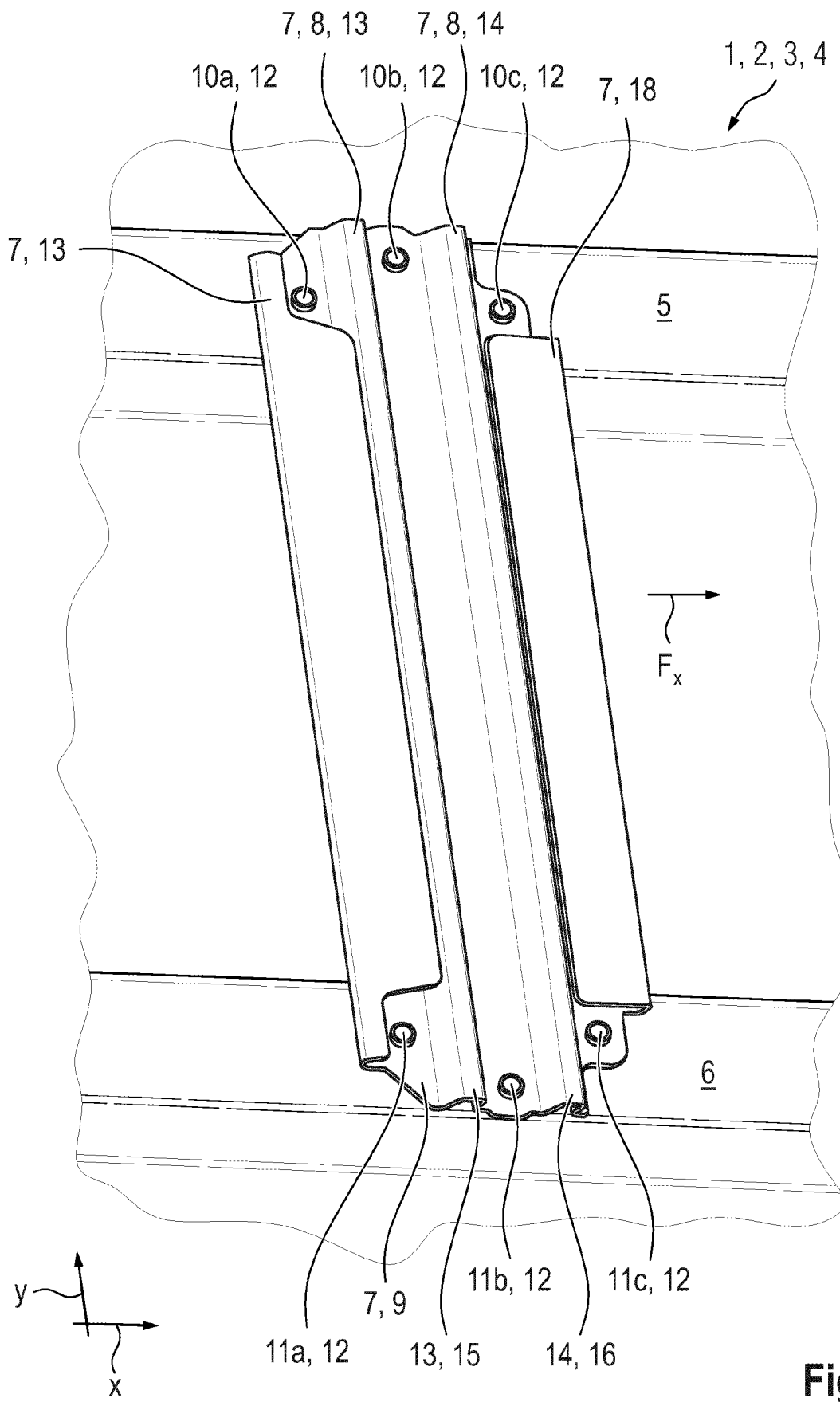
FIG. 1 shows a perspective view of a floor of a body of a motor vehicle, wherein a hollow profile region, which is bridged by a roll-formed crossbeam, is formed in the floor.

FIG. 1 shows a floor 2 of a body 3 of a motor vehicle 1. An open hollow profile 4 is formed in the floor. The open hollow profile 4 is a tunnel, for example, in particular a central vehicle tunnel, for the arrangement of a cardan shaft, which is not shown, for example.

Floor sections 5 and 6 of the floor 2 are attached to the open hollow profile 4 in the transverse vehicle direction y in each case. The lateral floor sections 5, 6 are designed as longitudinal beam elements 5, 6 in the embodiment shown.

The open hollow profile 4 is bridged in the embodiment shown by a crossbeam 7. The open hollow profile 4 can be bridged, depending on the requirement, by a crossbeam 7 or by multiple crossbeams 7.

The respective crossbeam 7, which bridges the open hollow profile 4, is generally used to ensure the power flow from the force transmission side, or the side facing the impact, via the crossbeam 7, to the side of the body facing away from the impact.

In the case of the bridging of a vehicle tunnel designed as an open hollow profile 4 by at least one crossbeam 7, the longitudinal beam elements or longitudinal profiles 5, 6 (floor sections) in the floor 2 of the body 3 side are stress-relieved, since the longitudinal beam elements 5, 6 (floor sections) have to absorb less load in the event that the motor vehicle 1 is involved in a side collision. The longitudinal beam elements 5, 6 (floor sections) on both sides of the open hollow profile 4 can therefore be designed in a weight-optimized manner.

The arrangement of a respective crossbeam 7, which bridges an open hollow profile 4, enables the torsional rigidity in the region of the open hollow profile 4 to be increased and the driving dynamic properties of the motor vehicle 1 are improved.

The crossbeam 7 is a roll-formed component which is produced from a sheet steel or a light metal. The crossbeam 7 usually has a thickness d which falls between 0.5 mm≤$d_7$≤8.5 mm.

A length L of the crossbeam 7 depends on a width of the open hollow profile 4 being bridged. The length L of the crossbeam 7 is usually between 300 and 500 mm.

A width B of the crossbeam 7 falls in a range of 100 mm≤B≤800 mm. A height H of the crossbeam 7 falls in a range between 15 mm≤H≤220 mm.

The number of U-shaped profile sections, of the open hollow profiles 13, 14, falls in a range between a single open hollow profile and five open hollow profiles.

The crossbeam 7 has three through-openings 10a, 10b, 10c and 11a, 11b and 11c at each of its opposite ends 8, 9 in the embodiment shown.

The crossbeam 7 is fastened to the floor sections 5, 6 at its opposite ends 8, 9 via fastening means 12, for example screws and nuts, which are not shown, or threads formed in the floor sections 5, 6.

Figure 2:
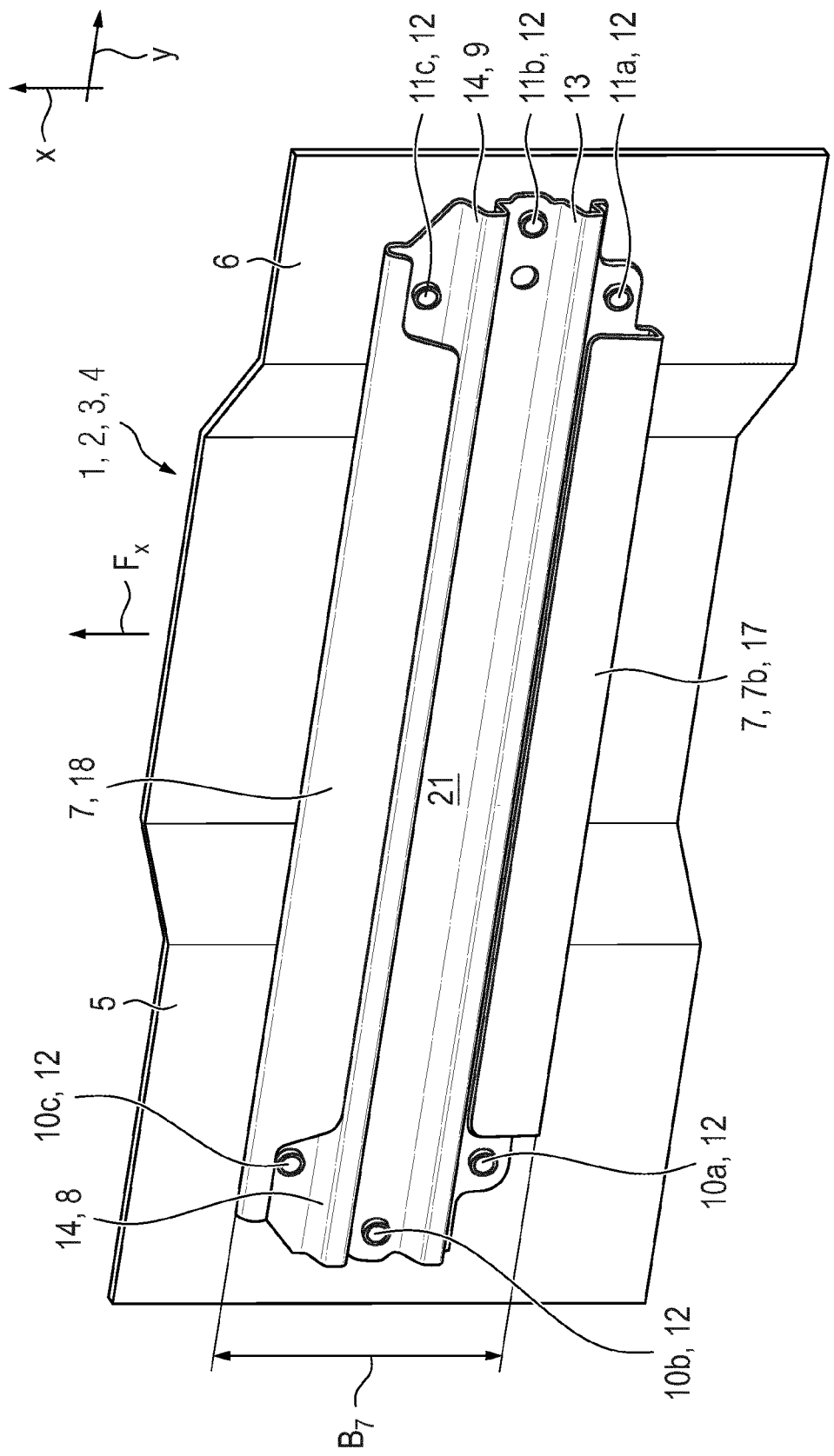
FIG. 2 shows a view of the crossbeam shown in FIG. 1 from a different perspective in the installed state.

It can be seen from FIGS. 1 and 2 that two U-shaped profile sections, open hollow profiles 13, 14, spaced apart from one another in the transverse vehicle direction y are formed on the crossbeam 7. An open hollow profile region 15, 16 of the two U-shaped profile sections, of the open hollow profiles 13, 14, in each case point to the floor 2 of the body 3 of the motor vehicle 1. In FIGS. 1 and 2, an arrow $F_x$ indicates the direction of travel of the motor vehicle 1.

In the longitudinal vehicle direction x, two front and rear, rounded profile sections 17b, 18b lying opposite on another are attached to the respective U-shaped profile section, to the open hollow profiles 13, 14. The rounded profile sections 17b, 18b running in the transverse vehicle direction y form the end sections 19, 20 of the crossbeam 7 in the longitudinal vehicle direction x.

The geometry of the front and rear rounded profile sections 17b, 18b of the crossbeam 7 are aerodynamically designed, so that the air resistance is low while driving.

Figure 3:
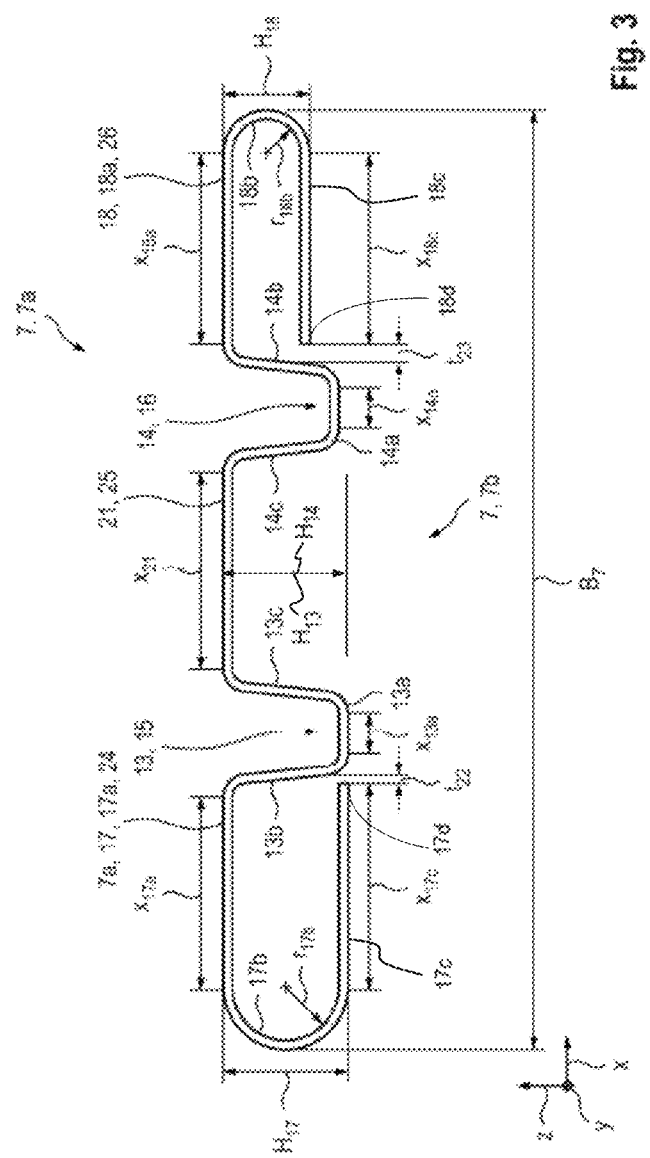
FIG. 3 shows a cross-sectional view of the crossbeam shown in the previous figures.

The cross sections of the rounded profile sections 17b, 18b can be seen in the cross-sectional view in FIG. 3. The U-shaped profile sections, the open hollow profiles 13, 14, can be seen running between the two rounded profile sections 17b, 18b in the vehicle transverse direction y.

A flat longitudinal section or connecting section 21 of the crossbeam 7 is formed between the two U-shaped profile sections, the open hollow profiles 13, 14. The two hollow profile regions 15, 16 of the U-shaped profile sections, the open hollow profiles 13, 14, point in the z-direction of the floor 2 of the body 3 which is not shown or in the direction of the open hollow profile 4 of the floor 2 shown in FIGS. 1 and 2.

In the embodiment shown in FIG. 3, the two rounded profile sections 17b, 18b have a rectangular cross section rounded on one outer side. In the mounted state, a flat section 17a, 18a of the two rounded profile sections 17b, 18b points to the floor 2 of the body 3 or in the direction of the open hollow profile 4 in the floor 2 shown in FIGS. 1 and 2.

In the embodiment shown, the flat section 17a, 18a in each case has approximately the same length $X_{17a}$, $X_{18a}$. In the embodiment shown, the respective length $X_{17a}$, $X_{18a}$ corresponds to the length $X_{21}$ of the connecting section 21.

In the embodiment shown in FIG. 3, a semicircular section 17b is attached to the flat section 17a, 18a of the rounded profile sections 17b, 18b in each case. The two semicircular sections 17b and 18b may have a different radius, or the same radius in a different embodiment, as shown in FIG. 3.

In the embodiment shown, a radius $r_{17b}$ of the rounded profile section 17b is greater than a radius $r_{18b}$ of the rounded profile section 18b. The radius $r_{18b}$ configured in the direction of travel is designed, in terms of its aerodynamic aspects, for low air resistance and optimal air circulation.

Attached to the semicircular profile sections 17b, 18b in each case is a further flat section 17c, 18c, which runs roughly parallel to the flat section 17a, 18a spaced apart from it by a height $H_{17}$ or $H_{18}$, and which has roughly the same length $X_{17c}$ and $x_{18c}$ in each case. The open hollow profile 13 has a height $H_{13}$ that is equal to the height $H_{17}$ and the open hollow profile 14 has a height $H_{14}$ that is greater than the height $H_{18}$.

One end 17d and 18d of the flat section 17c, 18c in each case is spaced apart from a section 13a, 14a running roughly horizontally of the U-shaped profile section in each case, or of the open hollow profile 13, 14 in each case, by a predefined amount $t_{22}$, $t_{23}$. The horizontally running sections 13a, 14a of the U-shaped profile section in each case, or the open hollow profile 13, 14 in each case, have a width $x_{13a}$ and $X_{14a}$.

Side walls 13b, 13c and 14b, 14c which run perpendicularly or obliquely and are integral in the assembled state are formed on the respective section 13a, 14a of the U-shaped profile section in each case, or the open hollow profile 13, 14 in each case. Upper, flat sections 17a, 18a are attached to the respective side walls 13b, 14b in the mounted state. The connecting section 21 is attached to the two opposite side walls 13c, 14c.

The geometric dimensions of the crossbeam 7, including dimensions such as the length, width and height, and the wall thickness, as well as the shape and number of the center open hollow profiles 13, 14, are configured in accordance with the rigidity required for force transmission in the longitudinal direction of the crossbeam 7. In addition, the respective shape of the outer, rounded profile section 17b, 18b in each case is selected such that an optimal air circulation and low air resistance are created.

The outer faces 24, 25, 26 of the flat section 17a of the connecting section 21 and the flat section 18a face the floor 2 or the open hollow profile 4 of the body 3 in the mounted state.

Both an upper side 7a pointing to the floor 2 of the body 3, and a lower side 7b pointing away from the floor 2 of the body 3 are discernible in the cross-sectional depiction in FIG. 3.

Figure 4:
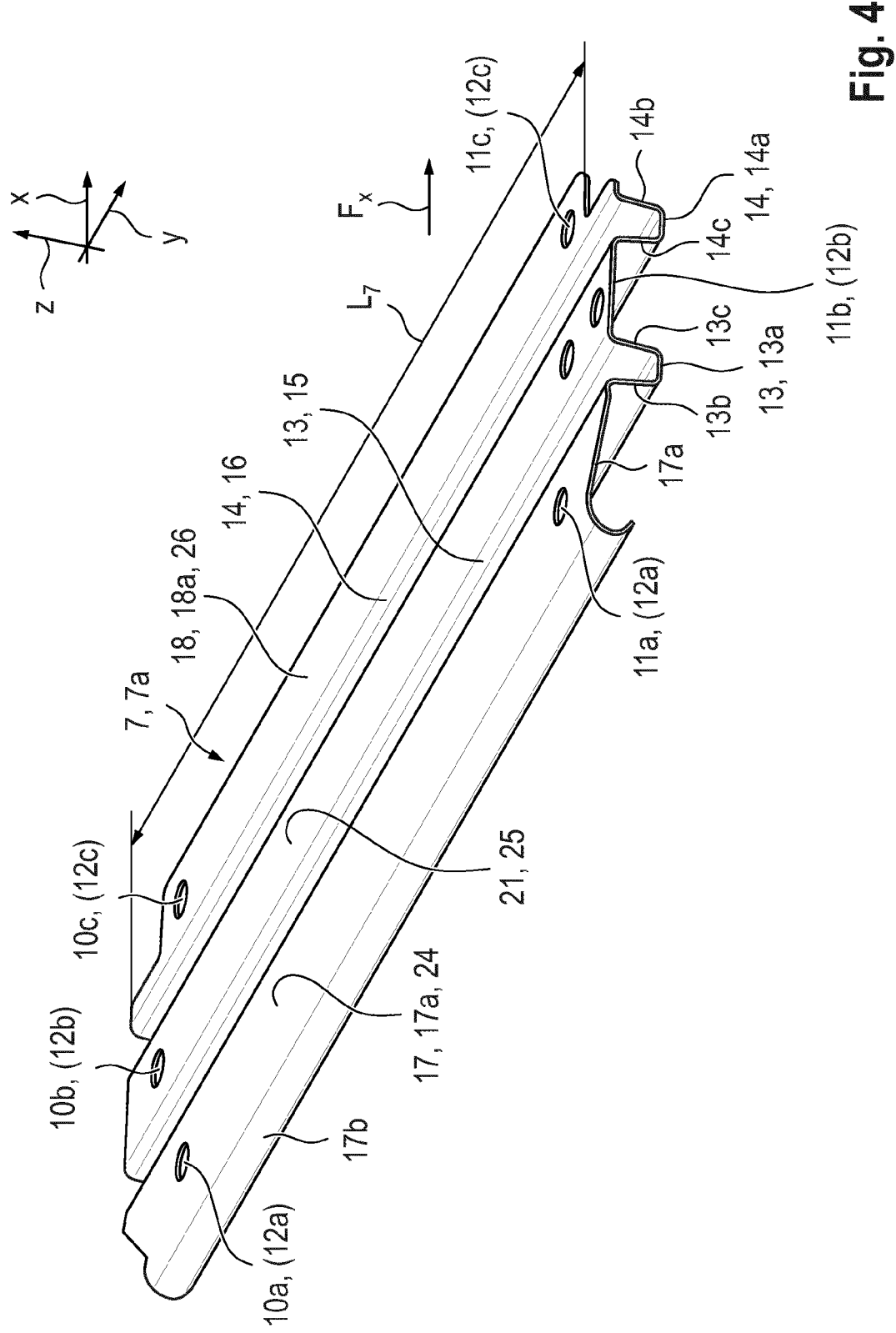
FIG. 4 shows a perspective view of the crossbeam shown in FIGS. 1 and 2, wherein an outer face of the crossbeam is shown in FIG. 4, which is screwed to the floor of the body in the mounted state.

A perspective view of the upper side 7a of the crossbeam 7 is depicted in FIG. 4. The outer faces 24, 25, 26 of the flat section 17a, of the connecting section 21, and of the flat section 18a are used as a bearing face in this case on the floor sections 5, 6 opposite thereto.

LIST OF REFERENCE CHARACTERS

1 Motor vehicle
2 Floor
3 Body
4 Hollow profile
5 Floor section
6 Floor section
7 Crossbeam
7a Upper side
7b Lower side
8 Crossbeam end
9 Crossbeam end
10a Through-opening
10b Through-opening
10c Through-opening
11a Through-opening
11b Through-opening
11c Through-opening
12 Fastening means
13 Open hollow profile
13a Horizontal section
13b Side wall
13c Side wall
14 Open hollow profile
14a Horizontal section
14b Side wall
14c Side wall 15 Hollow profile region
16 Hollow profile region
17 Profile section
17a Flat section
17b Rounded profile section
17c Flat section
17d Flat section end
18 Profile section
18a Flat section
18b Rounded profile section
18c Flat section
18d Flat section end
19 Crossbeam end section
20 Crossbeam end section
21 Connecting section
24 Outer face
25 Outer face
26 Outer face
B Crossbeam width
d Crossbeam thickness
$F_x$ Direction of travel
H Crossbeam height
$H_{13}$ Height
$H_{14}$ Height
$H_{17}$ Height
$H_{18}$ Height
L Crossbeam length
$t_{22}$ Amount
$t_{23}$ Amount
X Longitudinal vehicle direction
$X_{17a}$ Length
$X_{17c}$ Length
$X_{18a}$ Length
$X_{18c}$ Length
$X_{13a}$ Width
$X_{14a}$ Width
Y Transverse vehicle direction

What is claimed is:

1. A motor vehicle, comprising:
a body which has a floor, wherein an open hollow profile is formed in the floor; and
a crossbeam, wherein the open hollow profile is bridged by the crossbeam;
wherein the crossbeam has at least one open hollow profile in a center region of the crossbeam, wherein a first outer profile section and a second outer profile section are integrally attached to the at least one open hollow profile in a transverse direction, wherein the first outer profile section and the second outer profile section are spaced apart from one another by the at least one open hollow profile, wherein the first outer profile section has a first rounded outer profile section and the second outer profile section has a second rounded outer profile section, and wherein the first rounded outer profile section and the second rounded outer profile section each have a substantially rectangular cross section rounded on one respective outer side.

2. The motor vehicle according to claim 1, wherein the at least one open hollow profile is U-shaped or is V-shaped.

3. The motor vehicle according to claim 1, wherein the first rounded outer profile section has a first height, wherein the second rounded outer profile section has a second height, and wherein the first height is greater than or equal to the second height.

4. The motor vehicle according to claim 3, wherein the at least one open hollow profile has a third height, wherein the third height is equal to the first height, and wherein the third height is greater than the second height.

5. The motor vehicle according to claim 1, wherein the crossbeam is a roll-formed component.

6. The motor vehicle according to claim 1, wherein the crossbeam is produced from a sheet steel or from a light metal.

* * * * *